United States Patent
Levy et al.

(10) Patent No.: US 11,929,837 B2
(45) Date of Patent: Mar. 12, 2024

(54) RULE COMPILATION SCHEMES FOR FAST PACKET CLASSIFICATION

(71) Applicant: MELLANOX TECHNOLOGIES, LTD., Yokneam (IL)

(72) Inventors: Gil Levy, Hod Hasharon (IL); Roni Bar Yanai, Even Yehuda (IL); Avi Urman, Yokneam Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 33 days.

(21) Appl. No.: 17/678,074

(22) Filed: Feb. 23, 2022

(65) Prior Publication Data
US 2023/0269037 A1  Aug. 24, 2023

(51) Int. Cl.
G06F 16/22 (2019.01)
G06F 16/28 (2019.01)
H04L 1/20 (2006.01)

(52) U.S. Cl.
CPC .......... H04L 1/201 (2013.01); G06F 16/2255 (2019.01); G06F 16/285 (2019.01)

(58) Field of Classification Search
CPC ..... G06F 16/2255; G06F 16/285; H04L 1/201
See application file for complete search history.

(56) References Cited

U.S. PATENT DOCUMENTS

| | | |
|---|---|---|
| 5,537,514 A | 7/1996 | Nishidai |
| 6,611,875 B1 | 8/2003 | Chopra et al. |
| 6,957,215 B2 | 10/2005 | Stark |
| 7,051,078 B1 | 5/2006 | Cheriton |
| 7,054,315 B2 | 5/2006 | Liao |
| 7,061,874 B2 | 6/2006 | Merugu et al. |
| 7,116,663 B2 | 10/2006 | Liao |
| 7,234,019 B1 | 6/2007 | Kao et al. |
| 7,366,830 B1 | 4/2008 | Maheshwari |
| 7,394,809 B2 | 7/2008 | Kumar et al. |
| 7,426,518 B2 | 9/2008 | Venkatachary et al. |
| 7,804,699 B2 | 9/2010 | Gupta et al. |
| 7,904,642 B1 | 3/2011 | Gupta et al. |
| 7,933,282 B1 | 4/2011 | Gupta et al. |
| 8,271,564 B2 | 9/2012 | Dade et al. |
| 8,290,934 B2 | 10/2012 | Stergiou et al. |
| 8,305,271 B2 | 11/2012 | Li et al. |

(Continued)

OTHER PUBLICATIONS

U.S. Appl. No. 16/865,560 Office Action dated May 23, 2022.

(Continued)

*Primary Examiner* — William Spieler
(74) *Attorney, Agent, or Firm* — Kligler & Associates Patent Attorenys Ltd.

(57) ABSTRACT

A classification apparatus includes a memory and a processor. The memory is configured to store rules corresponding to a corpus of rules in respective rule entries, each rule includes a respective set of unmasked bits having corresponding bit values, and at least some of the rules include masked bits. The rules in the corpus conform to respective Rule Patterns (RPs), each RP defining a respective sequence of masked and unmasked bits. The processor is configured to cluster the RPs, using a clustering criterion, into extended Rule Patterns (eRPs) associated with respective hash tables including buckets for storing rule entries. The clustering criterion aims to minimize an overall number of the eRPs while meeting a collision condition that depends on a specified maximal number of rule entries per bucket.

21 Claims, 4 Drawing Sheets

(56) References Cited

U.S. PATENT DOCUMENTS

| | | |
|---|---|---|
| 8,462,786 B2 | 6/2013 | Liu et al. |
| 8,468,296 B1 | 6/2013 | Cohen |
| 8,619,766 B2 | 12/2013 | Wang et al. |
| 8,856,203 B1 | 10/2014 | Schelp et al. |
| 8,861,347 B2 | 10/2014 | Bloch et al. |
| 8,874,842 B1 | 10/2014 | Kimmel et al. |
| 8,938,469 B1 | 1/2015 | Keen et al. |
| 9,087,586 B2 | 7/2015 | Bosshart |
| 9,098,601 B2 | 8/2015 | Wang |
| 9,111,615 B1 | 8/2015 | Jiang |
| 9,171,030 B1 | 10/2015 | Arad et al. |
| 9,223,711 B2 | 12/2015 | Philip et al. |
| 9,245,626 B2 | 1/2016 | Fingerhut et al. |
| 9,262,312 B1 | 2/2016 | Gazit et al. |
| 9,270,592 B1 | 2/2016 | Sites |
| 9,317,517 B2 | 4/2016 | Attaluri et al. |
| 9,344,366 B2 | 5/2016 | Bouchard et al. |
| 9,406,381 B2 | 8/2016 | Akerib et al. |
| 9,411,908 B2 | 8/2016 | Valency et al. |
| 9,424,366 B1 | 8/2016 | Gazit et al. |
| 9,438,505 B1 | 9/2016 | Zhou et al. |
| 9,461,931 B1 | 10/2016 | Asveren |
| 9,543,015 B1 | 1/2017 | Roy |
| 9,569,561 B2 | 2/2017 | Wildman et al. |
| 9,627,063 B2 | 4/2017 | Dharmapurikar |
| 9,659,046 B2 | 5/2017 | Sen et al. |
| 9,672,239 B1 | 6/2017 | Rottenstreich et al. |
| 9,704,574 B1 | 7/2017 | Shamis |
| 9,779,123 B2 | 10/2017 | Sen et al. |
| 9,785,666 B2 | 10/2017 | Li et al. |
| 9,866,479 B2 | 1/2018 | Wang et al. |
| 9,892,057 B2 | 2/2018 | Levy et al. |
| 9,984,144 B2 | 5/2018 | Levy et al. |
| 10,049,126 B2 | 8/2018 | Levy et al. |
| 10,068,034 B2 | 9/2018 | Levy et al. |
| 10,097,378 B2 | 10/2018 | Dong et al. |
| 10,313,231 B1 | 6/2019 | Bosshart |
| 10,944,675 B1 | 3/2021 | Remen et al. |
| 11,108,728 B1 | 8/2021 | Boutros et al. |
| 11,588,821 B1 | 2/2023 | Detwiler et al. |
| 2002/0023080 A1 | 2/2002 | Uga et al. |
| 2002/0089937 A1 | 7/2002 | Venkatachary et al. |
| 2002/0154636 A1 | 10/2002 | Thomas |
| 2003/0051165 A1 | 3/2003 | Krishnan et al. |
| 2003/0123459 A1 | 7/2003 | Liao |
| 2004/0100950 A1 | 5/2004 | Basu et al. |
| 2005/0147113 A1 | 7/2005 | Brown |
| 2006/0209725 A1 | 9/2006 | Cadambi et al. |
| 2006/0271539 A1 | 11/2006 | Loeb |
| 2008/0192754 A1 | 8/2008 | Ku et al. |
| 2008/0215518 A1 | 9/2008 | Matsuda |
| 2008/0228691 A1 | 9/2008 | Shavit et al. |
| 2008/0259667 A1 | 10/2008 | Wickeraad |
| 2009/0097654 A1 | 4/2009 | Blake |
| 2010/0036820 A1 | 2/2010 | Stergiou et al. |
| 2010/0080223 A1 | 4/2010 | Wong et al. |
| 2010/0269024 A1 | 10/2010 | Hao et al. |
| 2012/0054467 A1 | 3/2012 | Fulton et al. |
| 2012/0137060 A1 | 5/2012 | Akerib et al. |
| 2012/0275466 A1 | 11/2012 | Bhadra et al. |
| 2013/0311492 A1 | 11/2013 | Calvignac et al. |
| 2014/0006706 A1 | 1/2014 | Wang |
| 2014/0089498 A1 | 3/2014 | Goldfarb et al. |
| 2014/0201307 A1 | 7/2014 | Banavalikar et al. |
| 2014/0215144 A1 | 7/2014 | Valency et al. |
| 2014/0310307 A1 | 10/2014 | Levy et al. |
| 2015/0039823 A1 | 2/2015 | Chen |
| 2015/0058595 A1 | 2/2015 | Gura et al. |
| 2015/0117450 A1 | 4/2015 | Thibaut |
| 2015/0127900 A1 | 5/2015 | Dharmapurikar et al. |
| 2015/0207735 A1 | 7/2015 | Kuramoto |
| 2015/0242429 A1 | 8/2015 | Varvello et al. |
| 2015/0244842 A1 | 8/2015 | Laufer et al. |
| 2016/0202932 A1 | 7/2016 | Kadu |
| 2016/0294625 A1 | 10/2016 | Mahkonen et al. |
| 2016/0315880 A1 | 10/2016 | Guo et al. |
| 2016/0350358 A1 | 12/2016 | Patel et al. |
| 2017/0046395 A1 | 2/2017 | Li et al. |
| 2017/0053012 A1 | 2/2017 | Levy et al. |
| 2017/0147254 A1 | 5/2017 | Adams et al. |
| 2017/0195253 A1 | 7/2017 | Annaluru et al. |
| 2017/0286292 A1 | 10/2017 | Levy et al. |
| 2017/0324663 A1 | 11/2017 | Menase |
| 2017/0346765 A1 | 11/2017 | Immidi |
| 2018/0011852 A1 | 1/2018 | Bennett et al. |
| 2018/0262599 A1 | 9/2018 | Firestone |
| 2018/0278525 A1 | 9/2018 | Levy et al. |
| 2018/0330412 A1 | 11/2018 | Fredriksson et al. |
| 2019/0036821 A1 | 1/2019 | Levy et al. |
| 2019/0042304 A1 | 2/2019 | Wang et al. |
| 2019/0149516 A1 | 5/2019 | Rajahalme et al. |
| 2019/0340028 A1 | 11/2019 | Fujiwara |
| 2020/0042629 A1 | 2/2020 | Levy et al. |
| 2020/0089816 A1 | 3/2020 | Shattah |
| 2020/0228449 A1 | 7/2020 | Shmilovici |
| 2021/0297151 A1 | 9/2021 | Levi et al. |
| 2021/0344596 A1 | 11/2021 | Mittelman |
| 2022/0075766 A1 | 3/2022 | Levy et al. |

OTHER PUBLICATIONS

U.S. Appl. No. 17/013,697 Office Action dated Jul. 12, 2022.
Hua et al., "Variable-Stride Multi-Pattern Matching for Scalable Deep Packet Inspection", IEEE Infocom , pp. 415-423, Rio de Janeiro, Brazil, Apr. 19-25, 2009.
Che et al., "DRES: Dynamic Range Encoding Scheme for TCAM Coprocessors", IEEE Transactions on Computers, vol. 57, No. 7, pp. 902-915, Jul. 2008.
Liu et al., "TCAM Razor: A Systematic Approach Towards Minimizing Packet Classifiers in TCAMs", IEEE/ACM Transactions on Networking, vol. 18, No. 2, pp. 490-500, Apr. 2010.
Liu et al., "All-Match Based Complete Redundancy Removal for Packet Classifiers in TCAMs", Proceedings of IEEE 27th Conference on Computer Communications (INFOCOM 2008), pp. 574-582, Apr. 13-18, 2008.
Liu et al., "Complete Redundancy Removal for Packet Classifiers in TCAMs", IEEE Transactions on Parallel and Distributed Systems, vol. 21, No. 4, pp. 424-437, Apr. 2010.
Taylor et al., "Scalable Packet Classification using Distributed Crossproducting of Field Labels", IEEE Infocom, pp. 1-12, 2005.
Kogan et al., "Strategies for Mitigating TCAM Space Bottlenecks," IEEE 22nd Annual Symposium on High-Performance Interconnects, IEEE Computer Society, pp. 25-32, year 2014.
Xu et al., "A Novel Hash-based Packet Classification Algorithm," 5th International Conference on Information Communications & Signal Processing, pp. 1504-1508, Dec. 2005.
Pontarelli et al., "Parallel d-Pipeline: A Cuckoo Hashing Implementation for Increased Throughput", IEEE Transactions on Computers, vol. 65, No. 1, pp. 326-331, Jan. 2016.
Reviriego et al., "Energy Efficient Exact Matching for Flow Identification with Cuckoo Affinity Hashing", IEEE Communications Letters, vol. 18, No. 5, pp. 885-888, May 2014.
Pontarelli et al., "Cuckoo Cache: A Technique to Improve Flow Monitoring Throughput", IEEE Internet Computing, vol. 20, issue 4, pp. 1-11, Jul.-Aug. 2016.
Zhou et al., "Scalable, High Performance Ethernet Forwarding with Cuckooswitch", CoNEXT '13, pp. 1-12, Santa Barbara, USA, Dec. 9-12, 2013.
Bi et al., "Hierarchical trie packet classification algorithm based on expectation-maximization clustering," research article, PLOS One, pp. 1-12, Jul. 13, 2017, as downloaded from https://journals.plos.org/plosone/article?id=10.1371/journal.pone.0181049.
Baboescu et al., "Scalable Packet Classification," IEEE/ACM Transactions on Networking, vol. 13, No. 1, pp. 2-14, Feb. 2005.
U.S. Appl. No. 17/402,545 Office Action dated Jan. 30, 2023.
U.S. Appl. No. 17/402,545 Advisory Action dated Apr. 18, 2023.
U.S. Appl. No. 17/013,697 Office Action dated Apr. 3, 2023.

(56) References Cited

OTHER PUBLICATIONS

Breslow et al., "Horton Tables: Fast Hash Tables for In-Memory Data-Intensive Computing," Proceedings of the 2016 USENIX Annual Technical Conference, pp. 281-294, Jun. 2016.
Levy et al., U.S. Appl. No. 17/402,545, filed Aug. 15, 2021.
Levy et al., U.S. Appl. No. 17/679,160, filed Feb. 24, 2022.
U.S. Appl. No. 17/402,545 Office Action dated Sep. 16, 2022.
U.S. Appl. No. 17/013,697 Office Action dated Dec. 14, 2022.
Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.
Pagh, R., "Cuckoo Hashing for Undergraduates", IT University of Copenhagen, pp. 1-6, Mar. 27, 2006.
Pagh et al., "Cuckoo Hashing", Journal of Algorithms, vol. 51, pp. 122-144, May 2004.
Kirsch et al., "Less Hashing, Same Performance: Building a Better Bloom Filter", Random Structures and Algorithms, vol. 33, issue 2, pp. 187-218, Sep. 2008.
Kirsch et al., "More Robust Hashing: Cuckoo Hashing with a Stash", SIAM Journal on Computing, vol. 39, Issue 4, pp. 1543-1561, Sep. 2009.
Patrow, A., "General Purpose Hash Function Algorithms", pp. 1-6, year 2000 http://www.partow.net/programming/hashfunctions/.
Laurence et al., "Spam Based Architecture for team for Low Area and Less Power Consumption", ARPN Journal of Engineering and Applied Sciences, vol. 10, No. 17, pp. 7607-7612, Sep. 2015.
Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.
Waldvogel et al., "Scalable High-Speed Prefix Matching", ACM Transactions on Computer Systems (TOCS), vol. 19, Issue 4, pp. 440-482, Nov. 2001.
Vamanan et al., "EffiCuts: optimizing packet classification for memory and throughput", Proceedings of the SIGCOMM conference, New Delhi, India, pp. 207-218, Aug. 30-Sep. 3, 2010.
Singh et al., "Packet classification using multidimensional cutting", Proceedings of SIGCOMM Conference, Karlsrube, German, pp. 213-224, Aug. 25-29, 2003.
Taylor et al., "ClassBench: a packet classification benchmark", WUCSE-2004-28, Applied Research Laboratory Department of Computer Science and Engineering, Washington University, Saint Louis, USA, pp. 1-37, May 21, 2004.
Demetriades et al., "An Efficient Hardware-basedMulti-hash Scheme for High Speed IP Lookup", 16th IEEE Symposium on High Performance Interconnects, pp. 103-110, Aug. 26-28, 2008.
Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.
Kasnavi et al., "A cache-based internet protocol address lookup architecture", Computer Networks, vol. 52 , pp. 303-326, year 2008.
Matousek, et al., "ClassBench-ng: Recasting ClassBench After a Decade of Network Evolution", Proceedings of the Symposium on Architectures for Networking and Communications Systems (ANCS '17), pp. 1-13, May 2017.
U.S. Appl. No. 17/402,545 Office Action dated May 25, 2023.
U.S. Appl. No. 17/679,160 Office Action dated Dec. 7, 2023.

RULE COMPILATION SCHEMES FOR FAST PACKET CLASSIFICATION

TECHNICAL FIELD

Embodiments described herein relate generally to data communication, and particularly to methods and systems for rule compilation for fast packet classification.

BACKGROUND

Packet-transfer devices in high-speed data networks, such as switches and routers, are required to perform flexible and sophisticated packet classification at high speed. For this purpose, many switches and routers store rules that are to be applied in processing packets.

Methods for packet classification using pre-stored rules are known in the art. For example, U.S. Pat. No. 9,984,144 of Levy at al. describes a method for classification that includes extracting respective classification keys from a collection of data items and receiving a corpus of rules for matching to the classification keys. At least some of the rules include masked bits in addition to the unmasked bits. Rule patterns are extracted from the corpus, defining different, respective sequences of masked and unmasked bits to which one or more of the rules conform. The rule patterns are grouped into extended rule patterns, such that the respective set of unmasked bits in any rule pattern is a superset of the unmasked bits in the extended rule pattern into which it is grouped. Rule entries corresponding to the rules are computed using the extended rule patterns and are stored in a random access memory (RAM). The data items are classified by matching the respective classification keys to the rule entries in the RAM.

SUMMARY

An embodiment that is described herein provides a classification apparatus including a memory and a processor. The memory is configured to store rules corresponding to a corpus of rules in respective rule entries, each rule includes a respective set of unmasked bits having corresponding bit values, and at least some of the rules include masked bits. The rules in the corpus conform to respective Rule Patterns (RPs), each RP defining a respective sequence of masked and unmasked bits. The processor is configured to cluster the RPs, using a clustering criterion, into extended Rule Patterns (eRPs) associated with respective hash tables including buckets for storing rule entries. The clustering criterion aims to minimize an overall number of the eRPs while meeting a collision condition that depends on a specified maximal number of rule entries per bucket.

In some embodiments, the processor is configured to store rules conforming to RPs clustered into a given eRP, in rule entries of a hash table allocated for the given eRP. In other embodiments, the processor is configured to cluster the RPs by selecting an initial RP (iRP) having a largest number of unmasked bits among the multiple RPs. In yet other embodiments, the processor is configured to add to the iRP other RPs that differ from the iRP by up to a predefined similarity measure limit.

In an embodiment, the processor is configured to cluster the RPs by adding to a temporary eRP a candidate RP that is closest in a hamming distance to the iRP among the multiple RPs. In another embodiment, the processor is configured to generate a merged eRP based on the temporary eRP and the candidate RP, and based on the merged eRP, to add to a temporary hash table one or more rule entries for storing respective rules conforming to the RPs in the temporary eRP and the candidate RP. In yet another embodiment, the processor is configured to define a collision event indicating that a number of rule entries contained in a bucket exceeds a specified maximal number of rule entries per bucket, and to evaluate the collision condition by comparing between a number of collision events occurring in constructing a temporary eRP and a predefined limit number.

In some embodiments, the processor is configured to attempt adding a candidate RP to the temporary eRP, and in response to identifying that the number of collision events does not exceed the predefined limit number, to update the temporary eRP to include the candidate RP. In other embodiments, the processor is configured to attempt adding a candidate RP to the temporary eRP, and in response to identifying that the number of collision events exceeds the predefined limit number, to seal the temporary eRP without the candidate RP. In yet other embodiments, a rule entry of a rule belonging to a given RP includes at least the given RP and a comparison value for matching in accordance with the given RP.

In an embodiment, the processor is configured to store the rules of the corpus in hash tables allocated for the respective eRPs, and the classification apparatus further includes a decision logic pipeline, configured to: receive a packet for classification and extract a key from a header of the received packet, select a given hash table among the hash tables, mask the key with the eRP corresponding to the selected hash table for producing an eRP-masked key, and apply a hash function to the eRP-masked key for accessing a bucket in the given hash table, attempt matching the key to one or more rule entries in the bucket, using RPs and comparison values in the rule entries, and in response to finding a matching rule in the bucket, apply to the packet an action predefined for the matching rule.

There is additionally provided, in accordance with an embodiment that is described herein, a method for rule compilation, including, in a network device storing rules corresponding to a corpus of rules in respective rule entries, each rule including a respective set of unmasked bits having corresponding bit values, and at least some of the rules including masked bits. The rules in the corpus conform to respective Rule Patterns (RPs), each RP defining a respective sequence of masked and unmasked bits. The method further includes clustering the RPs, using a clustering criterion, into extended Rule Patterns (eRPs) associated with respective hash tables including buckets for storing rule entries, the clustering criterion aims to minimize an overall number of the eRPs while meeting a collision condition that depends on a specified maximal number of rule entries per bucket.

These and other embodiments will be more fully understood from the following detailed description of the embodiments thereof, taken together with the drawings in which:

DETAILED DESCRIPTION OF EMBODIMENTS

Overview

Embodiments that are described herein provide improved methods and systems for compiling classification rules. For achieving low-latency classification, the disclosed compilation schemes aim to minimize the overall number of hash tables while limiting bucket occupancy in each of the hash tables.

Large-scale, high-speed packet networks, such as those deployed in modern data centers, require switching and forwarding elements to support large numbers of rules for packet classification and handling. Network management standards and practices, such as the OpenFlow protocol, are driving demand both to increase the number of rules implemented by network elements and to enable frequent modification of the rules by remote administration.

A network device such as a switch or router typically classifies packets by matching between a key derived from a packet header and rule entries pre-stored in a database. In case of a match, the rule entry can be used to trigger various actions for application by the network device, such as forwarding decisions, packet encapsulation and de-capsulation, security filtering, and quality of service classification.

For high degree of flexibility in rule definition, rule entries may contain not only ones and zeroes, to be matched against the key, but also "don't care" bits, which will match either a zero or a one in the key. These "don't care" bits in the rule entries are commonly referred to as "masked" bits (denoted 'x'), while bits having a defined value (1 or 0) are referred to as "unmasked" (denoted 'u').

In principle, a network device could use Ternary Content-Addressable Memory (TCAM) components to store rule entries that may include both unmasked and masked bits. TCAMs, however, are costly in terms of power consumption and chip area, and these costs effectively limit the number of rules that can be supported by a single network device.

The disclosed embodiments enable exact matching of classification keys using hash tables. (Hash tables require only RAM, and not TCAM.) Since the rules can include don't care ('x') bits, they cannot be directly used in the exact matching tables, because a hash function will not generally map all the rules that match the 'x' bits to a unique position. Therefore, in the present embodiments, the rules are mapped to entries in a matching table in RAM using only the unmasked bits of the rules. This mapping makes use of Rule Patterns (RPs). RPs define sequences of masked and unmasked bits to which one or more of the rules conform. Any given RP is thus defined by the positions of the 'u' bits. The rules belonging to a given RP can then be stored and retrieved using exact matching on the 'u' bits of the given RP.

If only the RPs were used for matching, however, the number of accesses to the hash tables in the RAM would grow with the number of RPs, resulting in performance degradation. The disclosed embodiments address this problem by grouping multiple RPs into a single eRP, for which a respective hash table is allocated. A hash table comprises multiple buckets, each of which can contain one or more rule entries. The rule entries in each hash table store rules belonging to the RPs grouped into the eRP of the hash table.

In various networks, the classification duration within network devices is an important performance factor. The classification duration typically increases with (i) the number of hash tables searched and (ii) the number of rule entries in the buckets of the hash tables.

Searching in multiple hash tables is required, for example, when the database supports matching a single packet to multiple rules of different respective priorities.

In the disclosed embodiments, rules are compiled for storage in a database so as to minimize packet classification latency. To this end, the compilation process aims to minimize the overall number of hash tables while limiting the number of rule entries in the buckets of each hash table.

Consider an embodiment of a classification apparatus comprising a memory and a processor. The memory is configured to store rules corresponding to a corpus of rules in respective rule entries, wherein each rule comprising a respective set of unmasked bits having corresponding bit values, and at least some of the rules comprising masked bits, and wherein the rules in the corpus conform to respective Rule Patterns (RPs), each RP defining a respective sequence of masked and unmasked bits. The processor is configured to cluster the RPs, using a clustering criterion, into extended Rule Patterns (eRPs) associated with respective hash tables comprising buckets for storing rule entries. The clustering criterion aims to minimize an overall number of the eRPs while meeting a collision condition that depends on a specified maximal number of rule entries per bucket.

In some embodiments, the processor stores rules conforming to RPs clustered into a given eRP, in rule entries of a hash table allocated for the given eRP. The processor clusters the RPs into a temporary eRP by selecting an initial RP (iRP) having a largest number of unmasked bits among the multiple RPs and adding to the iRP one or more candidate RPs. For example, the processor adds to the temporary eRP a candidate RP that is closest in a hamming distance to the iRP among the multiple RPs.

In an embodiment, to test whether a candidate RP is valid to be included in the temporary eRP, the processor generates a merged eRP based on the temporary eRP and the candidate RP. Based on the merged eRP, the processor adds to a temporary hash table rule entries of rules conforming to the RPs in the temporary eRP and the candidate RP, while evaluating the collision condition.

In some embodiments, the processor defines a collision event indicating that the number of rule entries contained in a bucket exceeds a specified maximal number of rule entries per bucket. The processor evaluates the collision condition by comparing between the number of collision events occurring in constructing the temporary eRP and a predefined limit number. In response to identifying that the collision condition is met, the processor updates the temporary eRP to include the candidate RP. In response to identifying that the collision condition is violated, the processor seals the temporary eRP without the candidate RP and starts constructing another eRP.

The rule entries contain information used for rule matching. In an embodiment, a rule entry of a rule belonging to a given RP comprises at least the given RP and a comparison value for matching in accordance with the given RP.

After the compilation process concludes, the processor stores the rules of the corpus in the hash tables allocated for the respective eRPs. At this point the network device is ready for packet classification, e.g., using a decision logic of the network device.

In some embodiments, upon receiving a packet for classification, a pipeline in the decision logic extracts a key from a header of the received packet, selects a given hash table among the hash tables, masks the key with the eRP corresponding to the selected hash table for producing an eRP-masked key, and applies a hash function to the eRP-masked key for accessing a bucket in the given hash table. The pipeline further attempts matching the key to one or more rule entries in the bucket, using RPs and comparison values in the rule entries. In response to finding a matching rule in the bucket, the decision logic applies to the packet an action predefined for the matching rule.

In the disclosed techniques, a rule compilation process aims to minimize packet classification latency. The disclosed compilation process minimizes the overall number of eRPs (and therefore also the number of hash tables) while limiting the number of rule entries in buckets of each hash table. Rule compilation using the disclosed embodiments results in a small average number of lookup operations per a classification operation.

System Description

Figure 1:
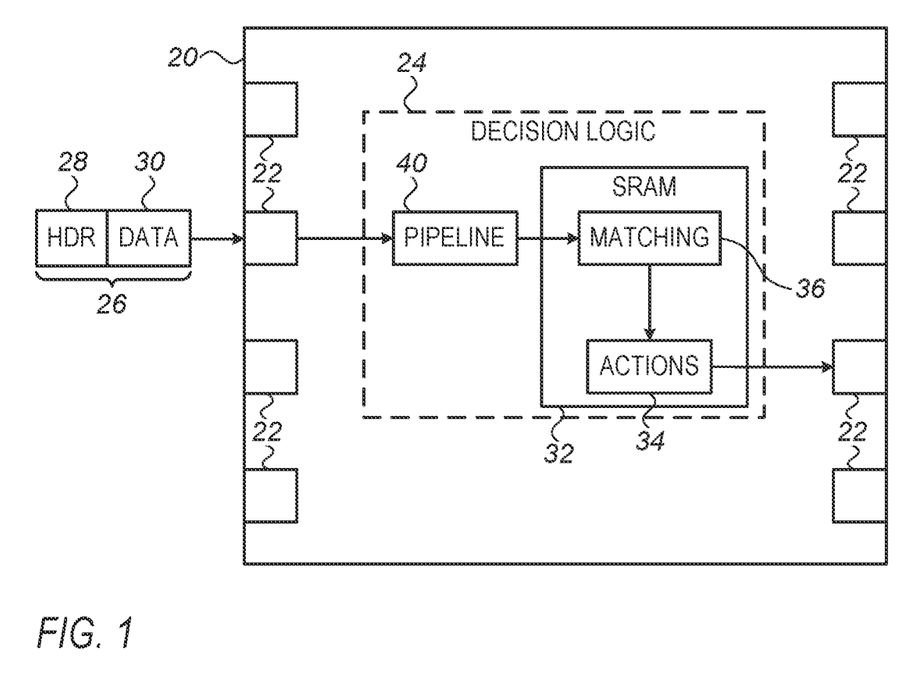
FIG. 1 is a block diagram that schematically illustrates a network device operating as a packet classification apparatus, in accordance with an embodiment that is described herein.

FIG. 1 is a block diagram that schematically illustrates a network device 20 operating as a packet classification apparatus, in accordance with an embodiment that is described herein. Typically, network device 20 is configured as a network switch or router, for example, with multiple ports 22 connected to a packet communication network. Decision logic 24 within network 20 applies classification rules in forwarding data packets 26 between ports 22, as well as performing other actions, such as encapsulation and decapsulation, security filtering, and/or quality-of-service functions. The circuitry needed for carrying out such forwarding and other functions will be apparent to those skilled in the art and is omitted from the figures for the sake of simplicity, in order to concentrate on the actual classification functions of decision logic 24.

In the pictured embodiment, decision logic 24 receives packet 26 containing a header 28 and payload data 30. A processing pipeline 40 in decision logic 24 extracts a classification key from each packet 26, typically including the contents of certain fields of header 28. For example, the key may comprise the packet 5-tuple (source and destination addresses and ports and a protocol identifier). Pipeline 40 matches the key against a matching database 36 containing a set of rule entries, which is stored in a memory 32 in network device 20. Memory 32 may comprise any suitable type of a storage device such as, for example, a Static Random Access Memory (SRAM). Memory 32 also contains a list of actions 34 to be performed when a key is found to match one of the rule entries. For this purpose, each rule entry typically contains a pointer to the particular action that logic 24 is to apply to packet 26 in case of a match.

Pipeline 40 typically comprises dedicated or programmable hardware logic, which is configured to carry out the functions described herein. For example, pipeline may comprise a suitable application-specific integrated circuit (ASIC). Alternatively or additionally, at least some of the functions of pipeline 40 may be implemented in a standalone or embedded microprocessor. (For example, such a microprocessor may be responsible for compiling classification rules received by network device 20 into matching database 36.) The microprocessor performs its functions under the control of software instructions, which are typically stored in tangible, non-transitory computer-readable storage media, such as electronic, optical, or magnetic memory media.

The rules in matching database 36 are defined by "unmasked bits", and wildcard ("don't care") bits or "masked bits" that are ignored. The unmasked bits are marked as 'u' bits, and the wildcard bits are marked as 'x' bits. Typically, only the unmasked bits are used for matching. In some embodiments, rules are specified using a 5-tuple format, as will be described further below.

In the description that follows, it is assumed that in RPs and eRPs, the 'u' bits and 'x' bits are assigned respective binary values, '1' and '0'. Moreover, a masking operation is carried out by applying a bitwise logical AND operation between a key and a RP or eRP.

The rules in matching database 36 are classified into Rule Patterns (RPs). In practical applications, a corpus may comprise tens of thousands of rules, which are typically classified into several hundred RPs.

An RP corresponding to one or more rules in the database has unmasked and masked bits in the same locations as the rules conforming to that RP. For example, both rules given by R1=111XXX11 and R2=010XXX01 conform to the same RP given by RP=UUUXXXUU.

In some embodiments, the RPs corresponding to the rules in matching database 36 are grouped into extended RPs (eRPs). Like RPs, each eRP contains unmasked bits and masked bits. An eRP contains 'u' bits in locations in which all the RPs grouped into this eRP contain 'u' bits, and 'x' bits in locations in which at least one of the grouped RPs contains 'x' bits. For example, the RPs given by RP1=UUUXXXUU and RP2=XUUXXUUU may be grouped into an eRP given by eRP=XUUXXXUU.

In some embodiments, a corpus of rules is provided for storage in matching database 36. To this end, a suitable compilation process is applied to the rules. In an embodiment, the rules are classified into RPs, which are further grouped into eRPs. Hash tables are allocated in the database, wherein each hash table is associated with a respective eRP. Following compilation, the hash tables are populated with the rules of the corpus. Compilation schemes aiming to minimize the classification latency will be described in detail below.

In classifying packets, a key derived from a packet header is matched to rule entries in the matching database. To access a bucket in a selected hash table, the key is masked with the eREP of the hash table. Furthermore, for matching to rule entries contained in the bucket, the key is masked with the RPs in these rule entries.

Structure of a Matching Database Applicable in Packet Classification

Figure 2:
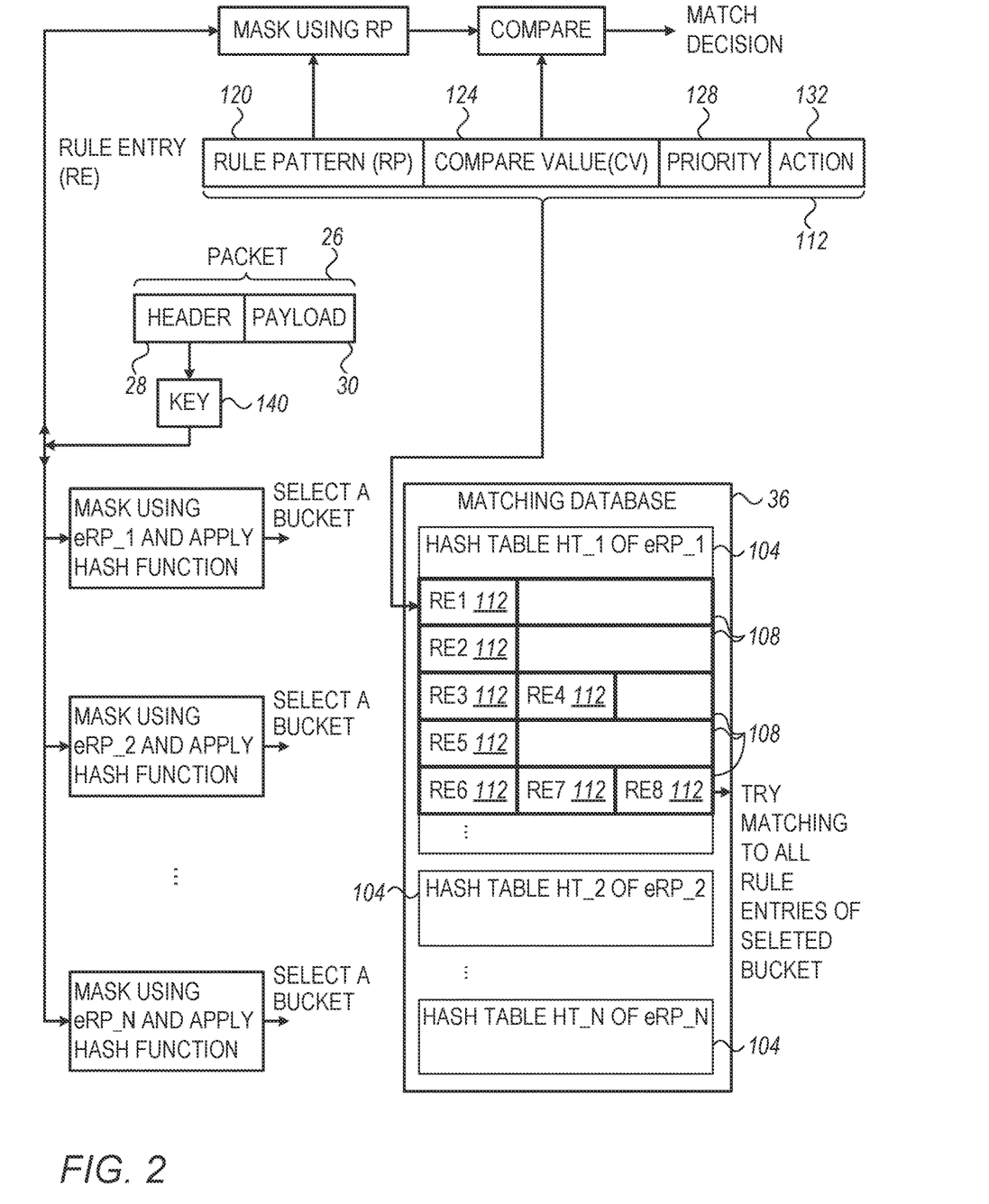
FIG. 2 is a diagram that schematically illustrates the structure of the matching database of FIG. 1 and how it is used in packet classification, in accordance with an embodiment that is described herein.

FIG. 2 is a diagram that schematically illustrates the structure of the matching database of FIG. 1 and how it is used in packet classification, in accordance with an embodiment that is described herein.

In describing FIG. 2 it is assumed that RPs corresponding to a corpus of rules have been grouped into a number N of eRPs (denoted eRP_1 ... eRP_N). It is further assumed that N hash tables 104 (denoted HT_1 ... HT_N) have been respectively allocated for the N eRPs, and populated with the rules of the corpus.

In the present example, each hash table 104 comprises multiple buckets 108, each of which can store one or more rule entries 112 (denoted REs in the figure). In the example of FIG. 2, hash table HT_1 stores multiple rule entries denoted RE1 . . . RE8 in five buckets. In some embodiments, bucket 108 is accessible by masking a key with the eRP of the hash table and applying a predefined hash function to the eRP-masked key.

Rule entry 112 comprises various fields including a RP 120, a Compare Value (CV) 124, a priority value 128, and an action 132. RP 120 comprises the RP to which the rule of the rule entry conforms. Typically, multiple rule entries 112 of different respective rules share a common RP. Compare value 124 is used for matching. Priority 128 is used for ranking among multiple rule entries matching to the same packet. Action 132 specifies an action to be applied to packet 26 in case of a match. In some embodiments, the action field comprises a pointer to a respective action in list of actions 34, as described above. In some embodiments, when packet 26 matches multiple rules in the database, the rule entry having the highest priority value (128) is selected, and the corresponding action is applied to packet 26.

Next is describe a classification process that decision logic 24 may apply to packets 26.

Upon receiving data packet 26, pipeline 40 extracts a key 140 from the packet. Typically, key 140 comprises a bit string made up by concatenating the contents of certain fields of header 28, as in packet handling protocols that are known in the art.

In a single matching operation, the decision logic scans one or more of the hash tables. Assume that the $i^{th}$ hash table (denoted HT_i) in the database is selected for matching. The pipeline masks key 140 with eRP_i of the $i^{th}$ hash table to produce an eRP-masked key. The pipeline then applies a hash function to the eRP-masked key, resulting in an access code (not shown) for accessing a bucket in HT_i. The selected bucket may contain one or more rule entries 112.

The pipeline typically attempts matching the key to each of the rule entries in the bucket until a match is found or all the rule entries have been tested. Consider, for example, a rule entry comprising certain RP and CV values. The pipeline masks key 140 with the RP to produce a RP-masked key, and detects a match when the RP-masked key equals the CV in the rule entry.

Compiling Rules for Fast Classification

Given a corpus of rules, the rules may be compiled for storage in hash tables allocated in database 36. Below are described compilation methods aiming to minimizes the number of eRPs while limiting the number of buckets having excessive rule entries, resulting in low-latency classification.

The inventors have found that the disclosed compilation methods (e.g., as described in FIGS. 3 and 4) enable efficient construction of rule entries for storage and lookup in memory 32 for the rules in a corpus. Alternatively, variations on these methods will be apparent to those skilled in the art after reading the present description and are considered to be within the scope of the present invention.

The methods described in FIGS. 3 and 4 below may be carried out either by an embedded processor in decision logic 24 or by an external processor (not shown in the figures).

Figure 3:
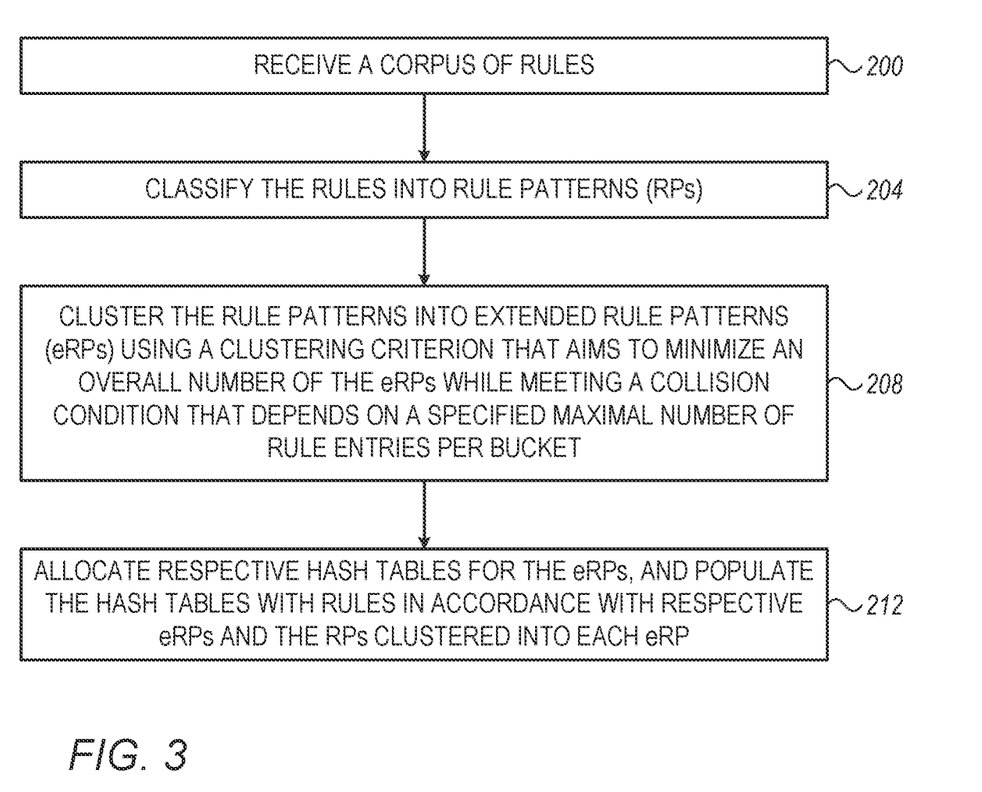
FIG. 3 is a flow chart that schematically illustrates a method for rule compilation for low-latency classification, in accordance with an embodiment that is described herein.

FIG. 3 is a flow chart that schematically illustrates a method for rule compilation for low-latency classification, in accordance with an embodiment that is described herein.

The method begins with the processor receiving a corpus of rules at a corpus reception step 200. At a classification step 204, the processor parses the rules in order to extract the RPs to which the rules in the corpus conform.

At a clustering step 208, the processor clusters the RPs of step 204 into eRPs, based on a clustering criterion that aims to minimize the overall number of the eRPs while meeting a collision condition that depends on a specified maximal number of rule entries per bucket.

At a database construction step 212, the processor allocates for the eRPs respective hash tables, and populates the hash tables with the rules of the corpus. In some embodiments, the processor populates a hash table allocated for a given eRP with rules belonging to RPs that were clustered into the given eRP. Following step 212 the method terminates.

To store a rule in a hash table, the processor generates, at step 212, a key comprising at least some of the unmasked bits of the rule. The processor further masks the key with the eRP of the hash table and applies to the eRP-masked key a predefined hash function to produce a hash result. The processor selects a bucket in the hash table using the hash result, and stores the rule in a rule entry in the selected bucket. In generating the rule entry, the processor includes in the rule entry the RP to which the rule conforms, and a comparison value comprising the key masked with that RP.

Figure 4:
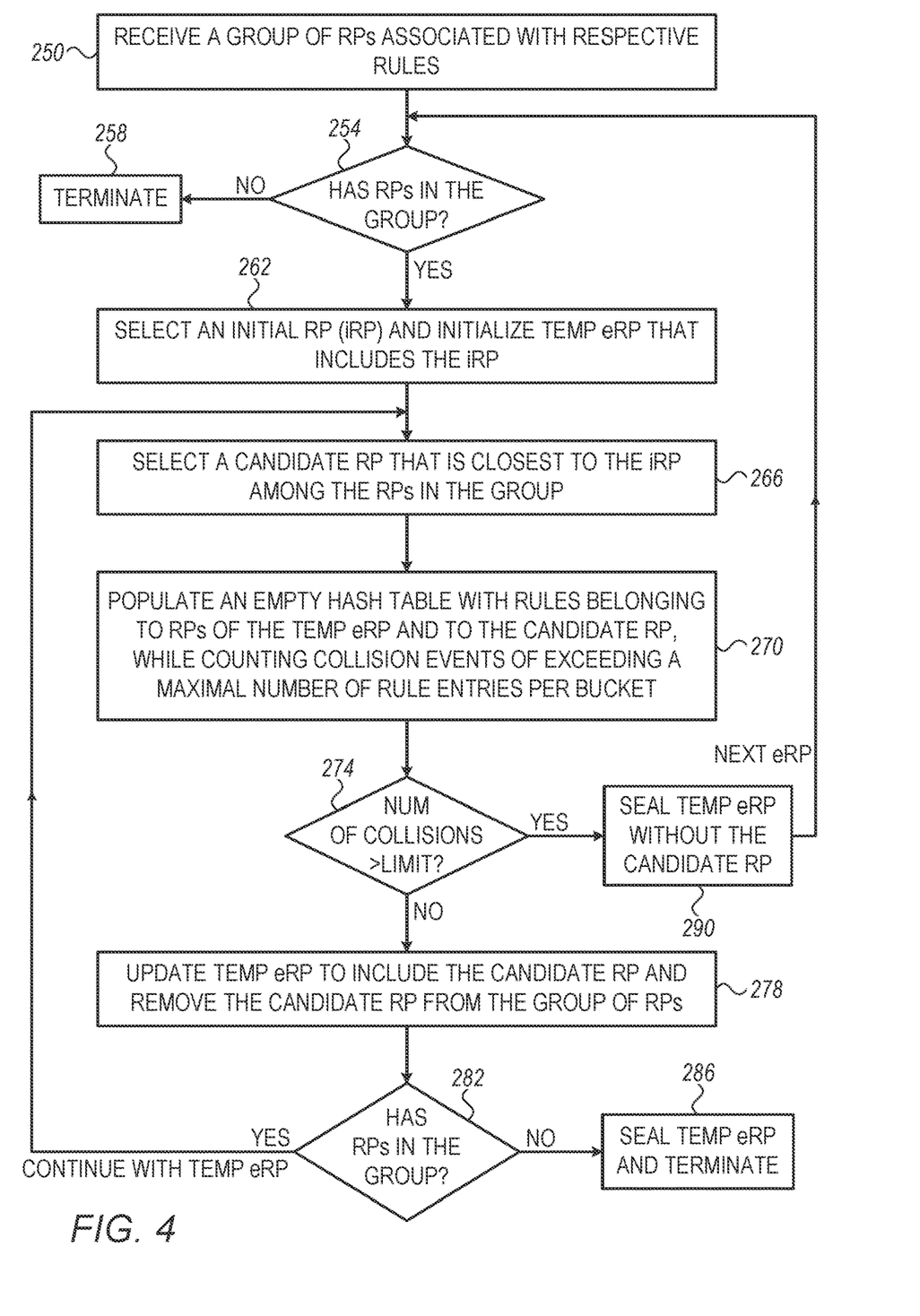
FIG. 4 is a flow chart that schematically illustrates a method for clustering Rule Patterns (RPs) into extended Rule Patterns (eRPs), in accordance with an embodiment that is described herein.

FIG. 4 is a flow chart that schematically illustrates a method for clustering Rule Patterns (RPs) into extended Rule Patterns (eRPs), in accordance with an embodiment that is described herein.

The method may be used, for example, in implementing step 208 of the method of FIG. 3.

The method begins with the processor receiving a group of RPs associated with respective rules, at a RPs reception step 250. In some embodiments, the received RPs correspond to a corpus of rules, e.g., as described in the method of FIG. 3.

To construct eRPs, the processor iterates over the RPs in the group, wherein in each iteration the processor constructs an eRP comprising selected RPs, as described herein.

At an iteration management step 254, the processor checks whether there are any RPs remaining in the group of RPs, and if not, proceeds to a termination step 258 and the method terminates. Otherwise, the processor proceeds to an initialization step 262 for starting a new eRP.

At step 262 the processor selects an initial RP (iRP) and a temporary eRP that includes the iRP. In some embodiments, the processor selects the iRP by selecting a RP having the largest number of unmasked bits among the RPs in the group. Such a selection typically results in eRPs containing a larger number of RPs, thereby reducing the overall number of eRPs.

At a candidate selection step 266, the processor selects a candidate RP to be added to the temporary eRP. The processor may select the candidate RP using any suitable method. In an embodiment, the processor selects the candidate RP that is closest (in terms of a suitable distance measure) to the iRP among the RPs in the group. The distance measure may comprise, for example, a hamming distance between bit strings.

At an emulation step 270, the processor emulates a process of storing rules related to the temporary eRP and candidate RP in a temporary hash table. To this end, the processor populates an empty hash table with rules conforming to the RPs included in the temporary eRP so far, as well as rules conforming to the candidate RP. For storing the rules in the temporary hash table, the processor calculates, based on the temporary eRP and the candidate RP, a merged eRP to be used for accessing buckets in the temporary hash table.

To limit the number of rule entries in buckets of the hash tables, the processor monitors the number of rule entries contained in the buckets of the temporary hash table at step 270. The processor detects a "collision event" in response to identifying that the number of rule entries in a bucket exceeds a predefined maximal number of rule entries per bucket.

At a collision condition checking step 274, the processor checks whether the number of collision events exceeds a predefined limit number, and if not (in which case the collision condition is satisfied), proceeds to an eRP updating step 278. At step 278, the processor updates the temporary eRP to include the candidate RP and removes the candidate RP from the group of RPs.

At a candidate loop management step 282, the processor checks whether there are still unprocessed RPs in the group, and if so, loops back to step 266 to select a subsequent candidate RP to be merged with the current temporary eRP. Otherwise, the processor seals the current temporary eRP and terminates the method, at a sealing and termination step 286.

When at step 274 the number of collision events exceeds the predefined limit number (the collision condition is violated), the processor seals the temporary eRP without the candidate RP at a sealing step 290, and loops back to step 254 to construct a subsequent eRP.

As described above, the method of FIG. 4 terminates following step 258 or 286. At termination, the eRPs constructed by the method comprise the temporary eRPs that were sealed at steps 286 and 290.

Compilation of Rules Specified in a 5-Tuple Format

In some embodiments, the rules to be compiled are specified in a 5-tuple format, commonly used in various communication protocols. The 5-tuple (e.g., in a packet header) includes source and destination addresses and ports and a protocol identifier. Rules and RPs may be specified using the 5-tuple format, as described herein. Consider an example rule denoted R1 specified in 5-tuple format as given in Table 1:

TABLE 1

| A rule R1 in 5-tuple format | | | | | |
|---|---|---|---|---|---|
| Src IP | Dst IP | Src Port | Dst Port | Protocol | Action |
| 10.0.0.0/24 | 10.0.0.2/32 | * | 80 | TCP | Allow |

The source address and destination address in R1 comprise address prefixes. For example, the unmasked bits in rule R1 comprise the upper 24 bits of the source address, 32 bits of the destination address and 8 bits of the protocol identifier. The rule pattern to which R1 conforms contains 5 fields, each of which containing unmasked and masked bits, as given by RP={U24X8, U32, X16, U16, U8}. The number attached to U or X designates the number of consecutive bits of this type. For example, the pattern U24X8 of the source address contains 24 unmasked bits followed by 8 masked bits. In general, the methods of FIGS. 3 and 4 are applicable with rules specified in the 5-tuple format.

Consider a key comprising a 5-tuple of a packet header. In some embodiments, different sets of fields in the key are used for hash and compare operations. For example, port fields may be ignored for key hashing, but be part of the compare value. As an example, let two RPs given by RP1={U16X16, U24X8, X16, U16, U8} and RP2={U16X16, U24X8, U16, X16, U8}. The two RPs share the same patterns in the source and destination address fields and in the protocol identifier field, but have different patterns in the source and destination port fields. In this case, key hashing may be based on the addresses and protocol fields, while omitting the port fields.

In the example above, assume that RP1 specifying any source port, a destination port 80, and the TCP protocol. Further assume that RP2 specifying a source port range 0-1024, any destination port, and the TCP protocol. In this case, RP1 and RP2 may be grouped into a common eRP based on the address and protocol fields and not on the port fields. To support such RP grouping, the method of FIG. 4 may be modified as necessary. In the present example, the comparison value in rule entries of rules conforming to RP1 and RP2 also contains a destination port in rules of RP1, and a source port in rules of RP2.

It is noted that rules belonging to RP1 and RP2 (in a common eRP) and that have the same values in the unmasked bits of the source and destination addresses, fall in the same bucket, which may result in a collision event.

Database Update

In some embodiments, while compiling a corpus of rules into eRPs (e.g., using the methods or FIGS. 3 and 4 above), a processor in decision logic 24 stores in memory 32 information regarding the resulting eRPs and the RPs contained in each of the eRPs. This information may be used for database update as described herein.

In some embodiments, after the corpus of rules has been compiled and the rules have been stored in database 36, the network device may be required to update the content in the database. Such update may be carried out by a processor in decision logic 24.

In some embodiments, to remove a rule from the database, the processor identifies the eRP containing the RP to which the rule conforms, and removes the rule from the hash table corresponding to the identified eRP. In an embodiment, in response to identifying that the RP in question contains no rules other than the removed rule, the processor removes the RP from the identified eRP.

In some embodiments, to add a rule to the database, the processor first checks whether the rule conforms to any RP contained in the eRPs. If the rule conforms to a RP in some eRP, the processor stores the rule in the hash table corresponding to that eRP. Otherwise, the processor adds the RP to a selected eRP, and stores the rule in the hash table of the selected eRP. This addition procedure is similar to that of adding a candidate RP to a temporary eRP as described above.

Performance Evaluation

The inventors have tested the disclosed compilation techniques using computer simulations.

The disclosed embodiments were tested on various rule corpuses and in various compilation configurations as shown in Table 2 below.

The first column in Table 2 depicts file names of public rule collections that were used for testing. For each file, the table shows the resulting number of eRPs in various compilation configurations. The second column refers to a baseline compilation configuration in which each eRP comprises a single RP. Each of the remaining columns depicts the number of eRPs resulting using the methods of FIGS. 3 and 4, with different settings of the "max number of collision events" (MAX_NC) constraint.

As seen in the table, the disclosed compilation methods result in a dramatic reduction in the number of eRPs compared to the baseline. For example, in the acl3 file, the number of eRPs reduces from 2406 to 130 and below, and in the ipc1file from 1536 to 45 and below.

TABLE 2

Number of eRPs in various configurations.

| Rule file | eRP = one Rp | Number of eRPs Max number of collision events (MAX_NC) | | | | |
|---|---|---|---|---|---|---|
| | | 1 | 2 | 3 | 7 | 15 |
| acl1 | 979 | 47 | 26 | 26 | 26 | 26 |
| acl2 | 1432 | 143 | 75 | 66 | 49 | 46 |
| acl3 | 2406 | 130 | 48 | 36 | 29 | 28 |
| acl4 | 2820 | 179 | 52 | 37 | 32 | 30 |
| acl5 | 315 | 68 | 22 | 18 | 18 | 18 |
| fw1 | 649 | 58 | 51 | 45 | 39 | 38 |
| fw2 | 198 | 21 | 18 | 16 | 15 | 15 |
| fw3 | 486 | 89 | 66 | 56 | 50 | 50 |
| fw4 | 337 | 86 | 72 | 66 | 61 | 63 |
| fw5 | 601 | 96 | 77 | 70 | 64 | 62 |
| ipc1 | 1536 | 45 | 22 | 17 | 16 | 15 |
| ipc2 | 48 | 2 | 2 | 2 | 2 | 2 |

As shown in Table 2, the number of eRPs typically reduces with increasing the value of MAX_NC. It is noted, however, that the classification duration may increase with MAX_NC because the number of rule entries to be tested in a bucket increases. The best MAX_NC value may therefore be selected based on the average number of lookup operations per a classification operation.

The embodiments described above are given by way of example, and other suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Classification apparatus, comprising:
  a memory, configured to store rules corresponding to a corpus of rules in respective rule entries, wherein each rule comprising a respective set of unmasked bits having corresponding bit values, and at least some of the rules comprising masked bits, and wherein the rules in the corpus conform to respective Rule Patterns (RPs), each RP defining a respective sequence of masked and unmasked bits;
  a processor, configured to:
    cluster the RPs, using a clustering criterion, into extended Rule Patterns (eRPs) associated with respective hash tables comprising buckets for storing rule entries, wherein the clustering criterion aims to minimize an overall number of the eRPs while meeting a collision condition that depends on a specified maximal number of rule entries per bucket;
    define a collision event indicating that a number of rule entries contained in a bucket exceeds a specified maximal number of rule entries per bucket; and
    evaluate the collision condition by comparing between a number of collision events occurring in constructing a temporary eRP and a predefined limit number;
  a port, configured to receive a packet from a communication network; and
  a decision logic pipeline, configured to classify the received packet using the eRPs.

2. The classification apparatus according to claim 1, wherein the processor is configured to store rules conforming to RPs clustered into a given eRP, in rule entries of a hash table allocated for the given eRP.

3. The classification apparatus according to claim 1, wherein the processor is configured to cluster the RPs by selecting an initial RP (iRP) having a largest number of unmasked bits among the multiple RPs.

4. The classification apparatus according to claim 3, wherein the processor is configured to add to the iRP other RPs that differ from the iRP by up to a predefined similarity measure limit.

5. The classification apparatus according to claim 3, wherein the processor is configured to cluster the RPs by adding to a temporary eRP a candidate RP that is closest in a hamming distance to the iRP among the multiple RPs.

6. The classification apparatus according to claim 5, wherein the processor is configured to generate a merged eRP based on the temporary eRP and the candidate RP, and based on the merged eRP, to add to a temporary hash table one or more rule entries for storing respective rules conforming to the RPs in the temporary eRP and the candidate RP.

7. The classification apparatus according to claim 1, wherein the processor is configured to attempt adding a candidate RP to the temporary eRP, and in response to identifying that the number of collision events does not exceed the predefined limit number, to update the temporary eRP to include the candidate RP.

8. The classification apparatus according to claim 1, wherein the processor is configured to attempt adding a candidate RP to the temporary eRP, and in response to identifying that the number of collision events exceeds the predefined limit number, to seal the temporary eRP without the candidate RP.

9. The classification apparatus according to claim 1, wherein a rule entry of a rule belonging to a given RP comprises at least the given RP and a comparison value for matching in accordance with the given RP.

10. The classification apparatus according to claim 9, wherein the processor is configured to store the rules of the corpus in hash tables allocated for the respective eRPs, and wherein the decision logic pipeline is configured to classify the received packet by:
  extracting a key from a header of the received packet;
  selecting a given hash table among the hash tables;
  masking the key with the eRP corresponding to the selected hash table for producing an eRP-masked key, and applying a hash function to the eRP-masked key for accessing a bucket in the given hash table;
  attempting matching the key to one or more rule entries in the bucket, using RPs and comparison values in the rule entries; and in response to finding a matching rule in the bucket, applying to the packet an action predefined for the matching rule.

11. The classification apparatus according to claim 1, wherein the processor is embedded within the decision logic pipeline.

12. A packet classification method, comprising:
in a network device, storing rules corresponding to a corpus of rules in respective rule entries, wherein each rule comprising a respective set of unmasked bits having corresponding bit values, and at least some of the rules comprising masked bits, and wherein the rules in the corpus conform to respective Rule Patterns (RPs), each RP defining a respective sequence of masked and unmasked bits;
clustering the RPs, using a clustering criterion, into extended Rule Patterns (eRPs) associated with respective hash tables comprising buckets for storing rule entries, wherein the clustering criterion aims to minimize an overall number of the eRPs while meeting a collision condition that depends on a specified maximal number of rule entries per bucket;
defining a collision event indicating that a number of rule entries contained in a bucket exceeds a specified maximal number of rule entries per bucket, and evaluating the collision condition by comparing between a number of collision events occurring in constructing a temporary eRP and a predefined limit number;
receiving a packet from a communication network via a port; and
classifying the received packet in a decision logic pipeline using the eRPs.

13. The method according to claim 12, and comprising storing rules conforming to RPs clustered into a given eRP, in rule entries of a hash table allocated for the given eRP.

14. The method according to claim 12, wherein clustering the RPs comprises selecting an initial RP (iRP) having a largest number of unmasked bits among the multiple RPs.

15. The method according to claim 14, and comprising adding to the iRP other RPs that differ from the iRP by up to a predefined similarity measure limit.

16. The method according to claim 14, wherein clustering the RPs comprises adding to a temporary eRP a candidate RP that is closest in a hamming distance to the iRP among the multiple RPs.

17. The method according to claim 16, wherein adding the candidate RP comprises generating a merged eRP based on the temporary eRP and the candidate RP, and based on the merged eRP, adding to a temporary hash table one or more rule entries for storing respective rules conforming to the RPs in the temporary eRP and the candidate RP.

18. The method according to claim 12, and comprising, attempting adding a candidate RP to the temporary eRP, and in response to identifying that the number of collision events does not exceed the predefined limit number, updating the temporary eRP to include the candidate RP.

19. The method according to claim 12, and comprising attempting adding a candidate RP to the temporary eRP, and in response to identifying that the number of collision events exceeds the predefined limit number, sealing the temporary eRP without the candidate RP.

20. The method according to claim 12, wherein a rule entry of a rule belonging to a given RP comprises at least the given RP and a comparison value for matching in accordance with the given RP.

21. The method according to claim 20, wherein classifying the packet comprises:
storing the rules of the corpus in hash tables allocated for the respective eRPs;
extracting a key from a header of the received packet;
selecting a given hash table among the hash tables;
masking the key with the eRP corresponding to the selected hash table for producing an eRP-masked key, and applying a hash function to the eRP-masked key for accessing a bucket in the given hash table;
attempting matching the key to one or more rule entries in the bucket, using RPs and comparison values in the rule entries; and
in response to finding a matching rule in the bucket, applying to the packet an action predefined for the matching rule.

* * * * *